Jan. 24, 1961 G. G. FELIU 2,969,135

CIPHERING MACHINES

Filed Dec. 31, 1957 4 Sheets-Sheet 1

INVENTOR

Gaetano G. Feliu

BY Stevens, Davis, Miller & Mosher

ATTORNEYS

INVENTOR
Gaetano G. Feliu
BY Stevens, Davis, Miller & Mosher
ATTORNEYS

Jan. 24, 1961 G. G. FELIU 2,969,135

CIPHERING MACHINES

Filed Dec. 31, 1957 4 Sheets-Sheet 3

INVENTOR

Gaetano G. Feliu

BY Stevens, Davis, Miller & Mosher

ATTORNEYS

INVENTOR
Gaetano G. Feliu

BY Stevens, Davis, Miller & Mosher
ATTORNEYS

United States Patent Office 2,969,135

Patented Jan. 24, 1961

2,969,135

CIPHERING MACHINES

Gaetano Giovanni Feliu, Rome, Italy
(649 S. Olive St., Los Angeles, Calif.)

Filed Dec. 31, 1957, Ser. No. 706,402

7 Claims. (Cl. 197—4)

This invention relates to improvements in cryptographic machines. More particularly it relates to improvements in cryptographic devices known as converters.

The converter is a small, compact, tape printing mechanical device designed for enciphering and deciphering messages. When properly set and operated, it will encipher a plain text message of any length, automatically printing the enciphered text on a paper tape, or it will decipher a message that has been previously cryptographed by another converter, printing the clear text on a paper tape. A typical converter of the type herein considered is that described in U.S. Letters Patent No. 2,247,-170 to Hagelin issued June 24, 1941.

The Hagelin patent represents the background over which the present improvement is made and in order to more clearly describe the operation of my invention I have shown various parts of the Hagelin converter and described the operation of these parts as necessary to a clear understanding of the method of operation of my improvement. It will be noted, however, that the invention may be incorporated in slightly varied forms in a wide variety of cryptographic devices, and it is not confined to any one such device.

The converter described in the above mentioned patent can be operated to encode or decode a message only as fast as the operator can orally receive and type a long dictated message from another person. There is also greater error possibility due to the necessity of using a second person to read the lengthy message to the operator as he encrypts the message.

The present invention enables the operator of the converter to encrypt a long message without any assistance from a second person. Further, its operation is such that the possibility of human error in encrypting messages is greatly reduced.

Broadly, my invention comprises a tape guide visually accessible to the operator of the ciphering machine which leads a tape bearing the plain message to be enciphered or deciphered to a point within the machine, and means for synchronizing the speed of movement of the tape through the tape guide with the speed of its encryption by the machine operator. At a point within the machine the plain message bearing tape is frictionally joined with the tape bearing the enciphered or deciphered message. By virtue of this frictional contact the plain message-bearing tape is moved in synchronism with the enciphered or deciphered message-bearing tape as the latter is fed from the ciphering machine.

Since the ciphered message tape is fed through the ciphering machine at a speed corresponding to the speed at which the operator types the plain message, it will readily be perceived that the plain message tape, by virtue of its synchronism with the ciphered message tape, is moved through the tape guide of my invention at a speed also corresponding to the typing speed of the operator. Thus, at all times, the operator has before him an unobstructed view of the exact part of the message which he is then about to encipher or decipher.

It is therefore an object of this invention to provide a device for greatly speeding the operation of converting machines.

It is a further object to provide an improvement in converting machines which is simple in construction, inexpensive to manufacture, and efficient in operation.

Another object is to provide a device of the above description which may be readily detached and transferred from one converter to another.

A further object of my invention is to provide a method for greatly enhancing the ease and speed of operation of ciphering machines.

Another object is the provision of a device of the type described which may be incorporated in converting machines without requiring alteration of the converting machine proper in any manner.

Other objects and advantages of the invention will be apparent upon consideration of the following detailed description of a preferred embodiment thereof in conjunction with the annexed drawings wherein.

Figures 3, 3A, 4, 5:
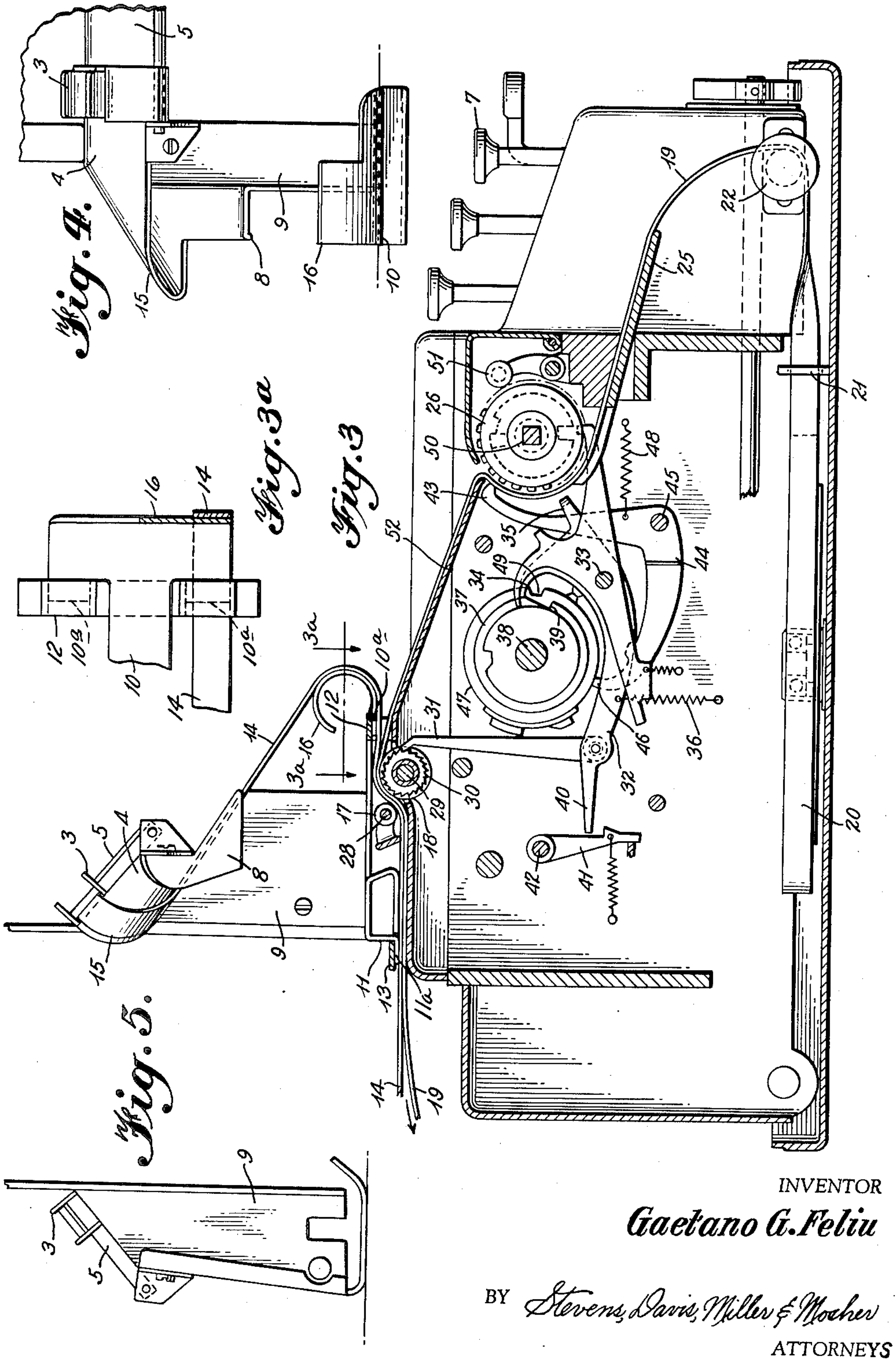
Figure 3 is an end view in section taken along line 3—3 of Figure 2.

Figure 3*a* is a detail view showing the manner in which the element 10 is attached to the ciphering machine;

Figure 4 is a view in elevation of one end of the novel tape guide forming a part of the subject invention;

Figure 5 is an end view of the second end of the tape guide of the subject invention;

Figures 6 to 9 show details of the tape printing and feeding mechanism of the Hagelin Patent No. 2,247,970 shown in different positions and included herein in order that the timing of the tape feed of the preferred embodiment may be understood.

Referring to the drawings in detail, the tape guide of my invention is indicated generally by reference numeral 1. The guide 1 includes a reading light 2, a pair of tape guide means 3, a base plate 4, a plastic cover plate 5, a place indicator pointer 6, tape channel 8, and support means 9. The tape guide 1 is attached to the ciphering machine proper by means of toes 10*a* and 11*a* of metal plates 10 and 11 which fit tightly under metal bands 12 and 13.

A tape 14, bearing the message to be enciphered or deciphered, is passed through the first guide means 3, beneath the plastic cover plate 5 and through the second guide means 3. The message tape 14 is then led around the curved portion 15 of base plate 4, through the tape channel 8, over the curved portion 16 of metal plate 10. From the curved portion 16 of metal plate 10, the message tape 14 is passed between rollers 17 and 18.

A tape 19 bearing the typed enciphered message (deciphered message when decoding) is led from a tape roll 20 located beneath the machine, through guide means 21 and over roller 22 (see Figure 3). A third tape 23 which bears the plain typed message (the enciphered message when decoding) is likewise led from a tape roll located beneath the machine (not shown), through a guide means and over the roller 22. Tapes 19 and 23 are passed from roller 22 through tape channels 24 in metal plate 25, thence over type wheels 26 and 27, along metal plate 52, and under metal band 12. The type wheels 26 and 27 are mounted on a setting shaft 50.

As the tape 14 bearing the message to be enciphered is threaded under metal band 12, it is superimposed on tape 23 bearing the enciphered message. The two superimposed tapes pass together between rollers 17 and 18.

Rollers 17 and 18 are mounted on shafts 28 and 29, respectively. Mounted on shaft 29 and rigidly attached to roller 18 is a ratchet wheel 30 engaged by the upper free end of a substantially vertical pawl 31 connected at its lower end to a lever 32. The lever 32 is pivoted at 33 and provided with two arms, 34 and 35. Arm 34, under the influence of a spring 36, bears against a cam disk 37 carried by a main shaft 38. The cam 37 is provided with a recess 39.

In the operation of the Hagelin cyphering machine, the movement of the lever 32 is normally checked so that it is only allowed to move half the way that corresponds to the depth of the recess 39 in cam 37. In order to obtain the said checking of the lever motion, the lever 32 is provided with a rearwardly extending arm 40 cooperating with a hook shaped stop arm 41 on a shaft 42.

The printing mechanism includes the type wheels 26 and 27 and printing hammers 43 adapted to press the tapes against the letters on the type wheels to be printed. Each printing hammer comprises one end of a bell crank lever 44 mounted on a shaft 45 and provided at its other end with a projection 46 bearing against a cam disk 47, the printing cam, carried by the main shaft 38. Bell crank lever 43 is influenced by a spring 48 tending to pull the printing hammer 43 against the type wheel 26 and the projection 46 against the printing cam 47. The printing cam is provided with a recess 49 adapted to receive the projection 46 one time during each revolution of the main shaft 38, the projection being caused to engage said recess under the action of spring 48. Inking of the types is effected by an inking roller 51.

The typing keys which are depressed by the operator in enciphering or decipering a message are indicated by reference numeral 7.

The operation of the preferred embodiment of my invention illustrated by the accompanying drawings will now be described. In describing the operation it will be assumed for convenience of expression that a message is being encrypted but it should be kept in mind that the same steps of operation occur when a message is being decrypted.

The tape guide 1 is first attached to the converting machine proper by hooking toes **10*a* and 11*a* of metal plates 10 and 11 under metal bands 12 and 13, so that tape guide 1** stands in an erect vertical position atop the machine.

The tape 14 bearing a plain typewritten message to be encoded is then led through the first guide means 3 and across base plate 4 to the second guide means 3. At this time the plastic cover plate 5 is pivoted to a raised position. After the tape 14 has been led through both guide means 3 and across the base plate 4, the plastic cover plate 5 is pivoted to its lowered position and rests upon the base plate 4 and tape 14. After being led through the second guide means 3, tape 14 is passed around the curved portion 15 of the base plate, thence through tape channel 8, and over the curved portion 16 of metal plate 10.

The plain message tape 14 is then passed along the under side of metal plate 10 and through metal band 12. At this point plain message tape 14 becomes superimposed upon the tape 19 bearing the enciphered message. In this relation both tapes 14 and 19 are led to a point immediately adjacent the rollers 17 and 18 so that the ends of the two tapes are ready to be threaded between the rollers.

The operator then depresses one of the keys 7 which causes roller 18 to rotate by means of mechanical linkages hereinafter to be explained. The rotation of roller 18 forces tapes 14 and 19 between rollers 17 and 18. Since a single depression of the keys 7 causes only an increment of rotation by roller 18 which is equivalent to one letter space, the depression should be repeated a number of times until approximately a 10 inch length of tapes 14 and 19 have passed through the rollers. The two tapes, still in their superimposed relation are then led through metal band 13. Due to the close tolerance of rollers 17 and 18, tapes 14 and 19 are pressed into close frictional contact, and by this means their movement through the rollers is synchronized.

The portion of tape 14 which has thus far been led through the device carries no part of the plain message to be encrypted; rather, that portion of tape 14 which is about to pass through the first guide means 3 carries the initial letters of the plain message. The keys 7 are again depressed until the first letter of the plain message to be enciphered is brought by the moving tape to a position approximately centrally located between the two guide means 3. Place indicator pointer 6 is adjusted to point at the first letter of the plain message on tape 14.

Tape 23 carries the plain message which the operator actually types. It passes parallel to tape 19 (the enciphered message tape) through the machine and between rollers 17 and 18. By the substantially equal frictional contact of the rollers, tape 23 is moved in synchronism with tapes 14 and 19. In this manner tape 14 carrying the plain message to be encrypted by the operator is made to move across the metal base plate 4 at exactly the same speed as tape 23 carrying the plain message as copied by the operator.

Tapes 14, 19, and 23, in synchronous movement, pass through rollers 17 and 18 at a speed in letter spaces per minute corresponding to the typing speed of the operator in letters per minute. This is accomplished by certain mechanical linkages of the Hagelin ciphering machine which will now be briefly described.

When the operator depresses one of the keys 7, an electrical circuit is energized which commences the rotation of main shaft 38 as described in U.S. Patent 2,247,-170 to Hagelin. The setting shaft 50 also commences rotary movement under the influence of mechanical linkages with the main shaft 38 as described in the above mentioned patent. As setting shaft 50 rotates, the type wheels 26 and 27, which are rigidly mounted thereon, also rotate. With each depression of a key, main shaft 38 completes one entire rotation. The angular movement of setting shaft 50, however, is arrested prior to the completion of one rotation in such a way that the letters and symbols on type wheels 26 and 27 which are to be typed on tapes 19 and 23 come to rest in a position opposite typing hammer 43. The operation of the machine which allows this arrestation of the setting shaft is described by Hagelin.

Figure 9:
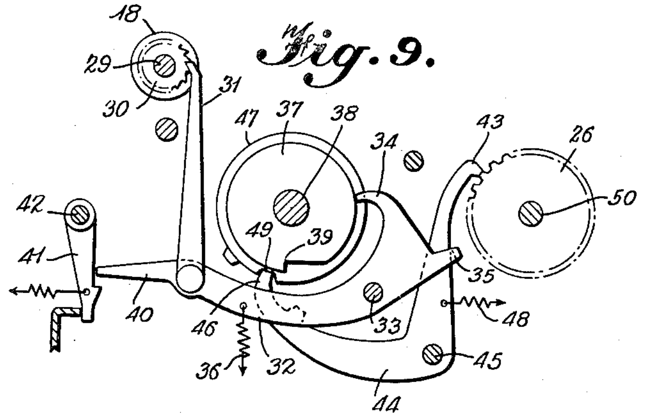

With the type wheels in this position the printing operation may now be effected. As main shaft 38 rotates, the cam wheels 47 and 37 rigidly mounted thereon also rotate. Recess 49 is located on printing cam 47 so that it does not reach projection 46 on the bell crank lever 44 until after the type wheels have stopped in printing position as above described. When recess 49 reaches a point opposite projection 46, the projection moves into the recess under the influence of the spring 48, and the typing hammer 43 strikes the tape pressing it against the letter to be typed. Figure 9 shows the position of the typing hammer 43, the bell crank lever 44, the projection 46, and the cam disk 47 at the instant the printing of the letter occurs.

Following the printing of the appropriate cipher symbol or letter on the tapes, the main shaft 38 continues its rotation. Near the end of one complete revolution cam disk 37 has been rotated to the position shown in Figure 7 so that recess 39 is opposite the arm 34 of lever 32. Under the influence of spring 36, the arm 34 is urged into recess 39 and by this motion, rearwardly extending arm 40 is moved downward. As arm 40 moves downward, the vertical pawl 31 also moves downward and out of engagement with ratchet wheel 30. After arm 34 engages the recess 39, it is then gradually lifted onto the circular periphery of the cam disk 37. Thus, the vertical pawl 31 is first lowered rapidly and then lifted more slowly while turning the ratchet wheel 30 and the feed roller 18 to a certain extent. Normally, the movement of the lever 32 is checked so that it is allowed to move only half the distance that corresponds to the depth of the recess 39 in cam disk 37. This distance which lever 32 normally moves corresponds to one tooth pitch of the ratchet wheel 30, and as a result each depression of a key normally results in an angular movement of ratchet wheel 30 and roller 18 corresponding to one tooth pitch of the ratchet wheel 30. The tooth pitch is so dimensioned as to allow the tapes to be fed through the rollers in steps equal to the normal letter pitch.

The Hagelin machine is so designed that the printing operation is effected in five letter groups with a space between every fifth and sixth letter. For this reason the arm 34 is allowed to move the full distance into recess 39 following the printing of every fifth letter. This results in pawl 31 moving downward a distance of two tooth pitches instead of the normal one, and correspondingly, the movement of the tapes two letter spaces instead of the normal one letter space. The means of effecting this spacing operation is fully set forth in U.S. Patent 2,247,170 to Hagelin.

As described above, however, for the normal one tooth pitch movement of the ratchet whteel 30 and roller 18, lever 32 is checked so that it is allowed to move only half the distance corresponding to the recess 39 in cam disk 37. In order to obtain this checking of the motion of lever 32, the downward movement of rearwardly extending arm 40 is arrested by hook shaped stop arm 41 (see Fig. 7).

The sequential operation of the described embodiment of our invention is now related. The tape 14 carrying the plain message to be enciphered is passed through the tape guide 1 and superimposed upon the tape 19 bearing the enciphered message as described above. The keys 7 of the Hagelin ciphering machine are depressed several times until the first letter of the message to be enciphered is brought to a position intermediate the two guide means 3. The place indicator pointer 6 is then adjusted to point at this first letter of the message. The preferred embodiment of my invention is now set for the encryption of the message.

Figure 1:
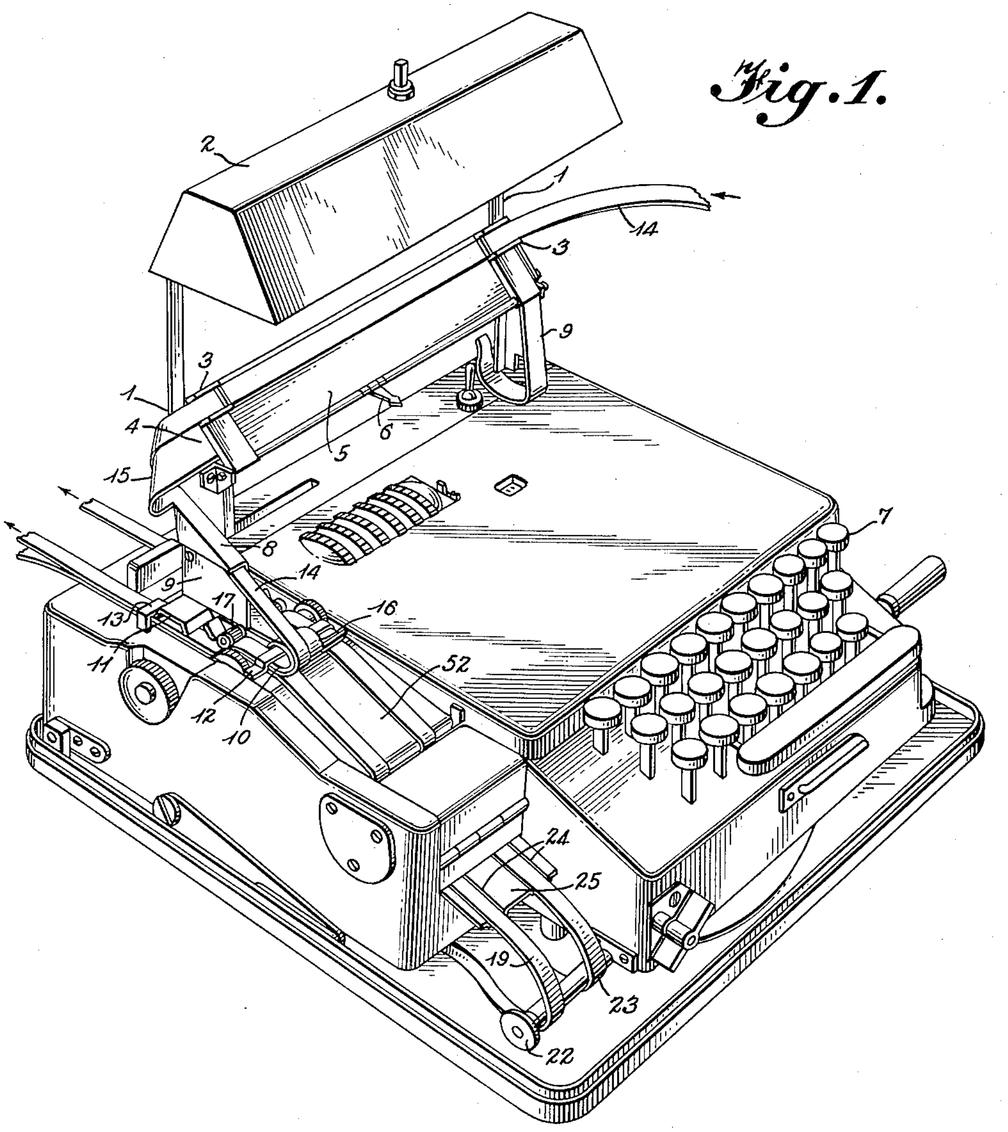
Figure 1 is a perspective view of a ciphering machine according to my invention.
Figure 2:
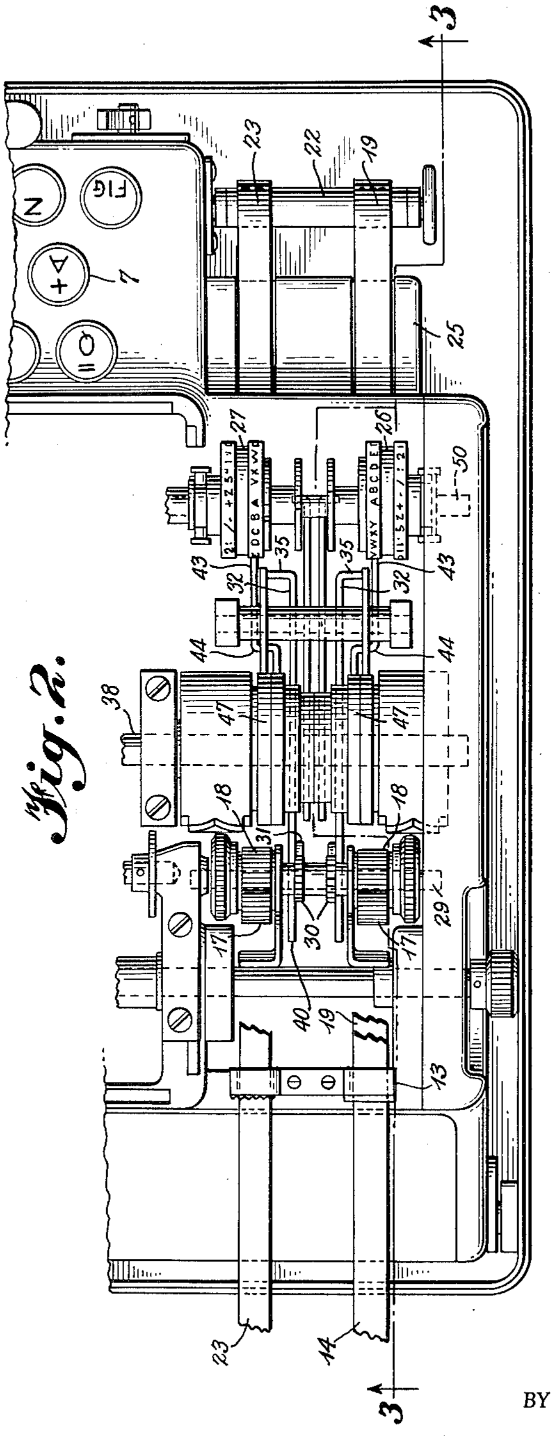
Figure 2 is a plan view of one end of the machine of Figure 1 showing parts which feed the ciphered and plain message tapes through the machine.
Figure 6:
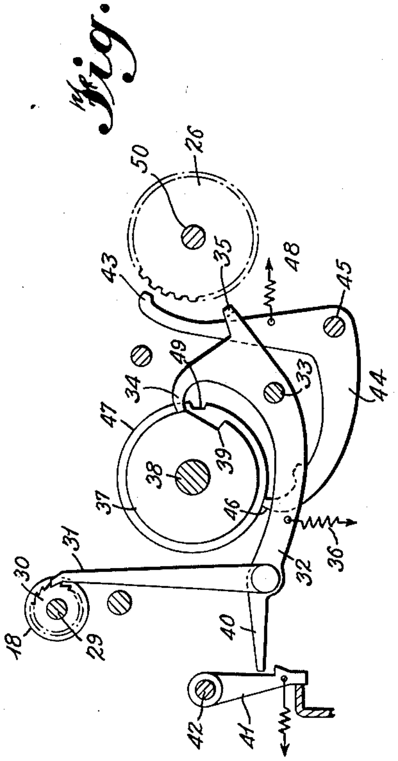
Figure 7:
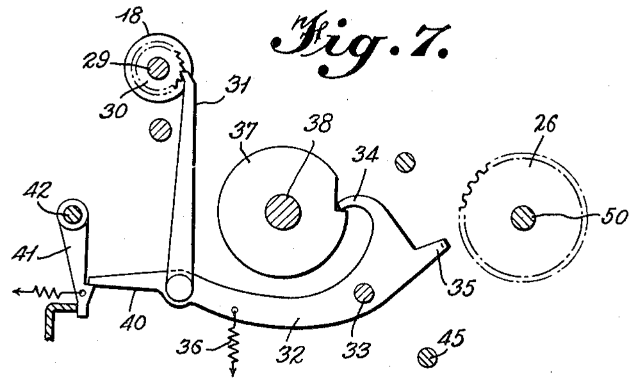
Figure 8:
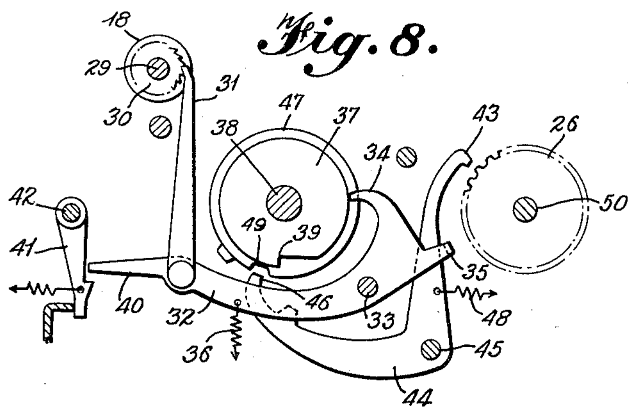

Before the operator depresses the key 7 corresponding to the first letter of the message to be enciphered, the printing and tape feeding mechanisms are in the position shown in Figure 6. The operator then commences to type the message as carried by the tape 14. As he depresses the key for the first letter, the main shaft 38 and setting shaft 50 commence their rotation. When main shaft 38 has reached the position shown in Fig. 8, the printing operation is then effected as shown in Fig. 9 and as described above. After the letters have been printed on the tapes, the main shaft 38 continues to rotate until it reaches the position shown in Fig. 7. At this time, pawl 31 makes its downward movement as shown in Fig. 7. With the completion of one revolution of the main shaft 38 and the return of the printing and tape feeding mechanisms to the position shown in Figure 6, the pawl 31 moves upward and urges the ratchet wheel 30 and roller 18 through an increment of arc corresponding to one letter space. This in turn moves the tapes 14, 19 and 23 one letter space.

Thus, with each depression of a key 7, the tape 14 is moved across the base plate 4 of the tape guide 1 a distance corresponding to one letter space. With this movement, the place indicator pointer 6 moves relatively to the tape so as to point at the next letter to be typed. Because of the synchronous movement of tapes 14, 19 and 23 the letter of the message which has just moved past the pointer 6 corresponds to the letter which has just been typed upon the plain message tape 23 and to the letter or symbol which has just been typed upon the enciphered message tape 19.

By this means, the operator of the machine is always cognizant of the place in the message to which he has typed. He is also always assured that only that part of the message with which he is immediately concerned is before him. Further, he can always make a rapid visual check of the message to be enciphered against both the plain message which he has actually typed and the corresponding part of the message as he has enciphered it.

From the above description, it will be seen that there has been provided a simple and effective means for greatly speeding the operation of a cryptographic converter. As seen from the drawings the tape guide 1 can be incorporated in the ciphering machine without alteration of the converter and allows the converter to be operated as fast as the typing speed of the operator.

The improvement of this invention may, of course, with slight and inconsequential modifications, be applied to other types of ciphering machines employing tapes, and while I have described above what is at present a preferred form of my invention, it will be understood that various changes may be made therein by those skilled in the art without departing from the spirit of the invention.

What is claimed is:

1. In a ciphering machine having a first tape, means to print indicia thereon, and means synchronized with the indicia printing means to advance said first tape, the improvement that comprises a strip tape guide visually accessible at all times to an operator of said machine and adapted to guide a second tape to a point contiguous to the path of the first tape whereby the said second tape may be connected to the said first tape to be advanced thereby.

2. In a ciphering machine having means defining a path through said machine for a first tape, means to print indicia on said tape, and means synchronized with the indicia printing means to advance said tape through said path, the improvement that comprises a strip tape guide visually accessible at all times to an operator of the machine and adapted to guide a second tape to a point contiguous to the said first tape path whereby the said second tape may be joined to said first tape and advanced thereby.

3. In a ciphering machine having a first tape, means to print indicia thereon, and means synchronized with the indicia printing means to advance said first tape, the improvement that comprises a strip tape guide visually accessible at all times to an operator of said machine, a second tape carried by said guide, and means responsive to the operation of said machine to move said second tape in synchronism with said first tape through said tape guide.

4. A tape guide for attachment to a ciphering machine having a first tape, means to print indicia thereon, means for advancing said first tape in synchronism with said indicia printing means, and a socket, said tape guide comprising a base plate, a standard for supporting said base plate at each of its ends, tape guide means located at each end of the upper surface of said base plate for guiding a second tape, a reading lamp attached to said base plate, a tape channel for further guiding said second tape, and projections at the base of one of said standards coacting with said socket to quick detachably fasten said tape guide to said ciphering machine whereby said tape channel terminates at a point contiguous to said first tape and whereby said second tape may be connected to said first tape.

5. The method that comprises printing a message on a first tape, advancing said first tape through a visually accessible path in synchronism with said printing, and connecting a second tape to said first tape to be pulled in synchronism therewith through a path visually accessible to an operator printing said first tape.

6. In a ciphering machine the combination which comprises a first means for guiding a first message-bearing tape through a path visually accessible to the operator of said machine, a second means for guiding a second tape to be printed upon into frictional contact with said first tape, and synchronizing means for synchronizing the movement of said first tape through said first means with said printing.

7. A ciphering machine strip tape guide for guiding a strip tape bearing a message to be enciphered through a visible path, said guide comprising a base plate, tape guide means located at each end of the upper surface of said base plate, a standard for supporting said base plate at each of its ends, a projection at the base of one of said standards for quick detachably fastening said tape guide to said ciphering machine, and a pointer for indicating the point in said message to which an operator has progressed in enciphering said message, said pointer being slidably mounted on said base plate.

References Cited in the file of this patent

UNITED STATES PATENTS

| | | |
|---|---|---|
| 812,177 | Barker | Feb. 13, 1906 |
| 1,482,753 | Lasker | Feb. 5, 1924 |
| 2,298,050 | Giles | Oct. 6, 1942 |
| 2,366,022 | Handley | Dec. 26, 1944 |